United States Patent
Lu et al.

(10) Patent No.: US 10,579,543 B2
(45) Date of Patent: Mar. 3, 2020

(54) METHOD AND ELECTRONIC DEVICE FOR PROCESSING INFORMATION

(71) Applicant: LENOVO (BEIJING) LIMITED, Beijing (CN)

(72) Inventors: Jianwei Lu, Beijing (CN); Qi Guo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 107 days.

(21) Appl. No.: 14/230,794

(22) Filed: Mar. 31, 2014

(65) Prior Publication Data

US 2014/0351488 A1    Nov. 27, 2014

(30) Foreign Application Priority Data

May 27, 2013 (CN) .......................... 2013 1 0201575

(51) Int. Cl.
*G06F 12/14* (2006.01)
*G06F 12/02* (2006.01)

(52) U.S. Cl.
CPC ........ *G06F 12/145* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 5,963,983 A | * | 10/1999 | Sakakura et al. | 711/202 |
| 6,263,378 B1 | * | 7/2001 | Rudoff et al. | 719/327 |
| 6,546,483 B1 | * | 4/2003 | Lai | 713/1 |
| 2005/0283602 A1 | * | 12/2005 | Vembu | G06F 21/53 713/150 |
| 2006/0232826 A1 | * | 10/2006 | Bar-El | G06F 21/6218 358/403 |
| 2007/0124407 A1 | * | 5/2007 | Weber | G06F 3/0607 709/212 |

(Continued)

FOREIGN PATENT DOCUMENTS

| | | |
|---|---|---|
| CN | 101840378 A | 9/2010 |
| CN | 102945208 A | 2/2013 |

OTHER PUBLICATIONS

Office Action issued in corresponding Chinese Application No. 201310201575.5 dated Sep. 12, 2016, and English translation thereof (17 pages).

*Primary Examiner* — Sean D Rossiter
*Assistant Examiner* — Stephanie Wu
(74) *Attorney, Agent, or Firm* — Osha Liang LLP

(57) ABSTRACT

The present disclosure provides a method and electronic device for processing information. The method is applied in a solid state storage apparatus which is connected to an electronic device. The solid state storage apparatus supports N logical-address-to-physical-address mapping tables different from each other simultaneously, wherein N is an integer greater than or equal to 1. The method comprises: receiving identity information for a user from the electronic device; determining a first logical-address-to-physical-address mapping table corresponding to the user based on the identity information; and assigning the first logical-address-to-physical-address mapping table to the user.

12 Claims, 5 Drawing Sheets

(56) References Cited

U.S. PATENT DOCUMENTS

| | | | |
|---|---|---|---|
| 2011/0029524 A1* | 2/2011 | Baptist | G06F 11/1076 707/737 |
| 2011/0238918 A1* | 9/2011 | Royer et al. | 711/128 |
| 2012/0151178 A1* | 6/2012 | Brownlow et al. | 711/206 |
| 2013/0019072 A1* | 1/2013 | Strasser | G06F 11/1044 711/154 |
| 2013/0086303 A1* | 4/2013 | Ludwig | G06F 21/00 711/103 |
| 2013/0219144 A1* | 8/2013 | Oe et al. | 711/165 |
| 2013/0262736 A1* | 10/2013 | Kegel | G06F 12/0888 711/3 |
| 2014/0068137 A1* | 3/2014 | Kegel | G06F 12/1009 711/6 |
| 2014/0089629 A1* | 3/2014 | Griffin et al. | 711/173 |
| 2014/0164677 A1* | 6/2014 | Borchers | G06F 3/0611 711/103 |
| 2014/0351488 A1* | 11/2014 | Lu | G06F 12/0246 711/103 |

* cited by examiner

METHOD AND ELECTRONIC DEVICE FOR PROCESSING INFORMATION

TECHNICAL FIELD

The present disclosure relates to the field of electronic technology, and in particular, to a method and electronic device for processing information.

BACKGROUND

With the development of the electronic device technology, various electronic devices appear in our works and lives, and numerous kinds of functions bring great convenience into our lives.

Accordingly, there is a need for users to store data, and various storage devices are designed in the industry. As a type of storage device, Solid State Disk (SSD) is becoming popular recently. An SSD device is composed of a control unit and memory units (flash chips). In brief, it is a hard disk made of arrays of solid state electronic memory chips. The specification and definition for its interface, functions, and uses are same as those for a normal hard disk. However, there is an important function in the Flash Transition Layer (FTL) module in the controller of a solid state disk: a logical address used when the hard disk is read by the host system is translated into a physical address in a flash chip on the solid state disk. The FTL module maintains the translation mapping relation from the logical addresses to the physical addresses, and such a translation mapping relation is also known as an L2P table. During operations of a solid state disk, there is one and only one valid L2P table which determines the data space of the solid state disk accessible by a host system.

Because there is only one L2P table, all users may access the data space determined by this table. Therefore, there is a problem that the stored data is not safe. In the prior art, to protect the security and privacy of personal data, encrypting will usually be performed in the software and/or hardware layers of a system.

However, in the process for implementing the technical solutions according to embodiments of the present disclosure, the inventor of the present disclosure realizes that the security level of conventional solutions for protecting data security and privacy by encryption at software and/or hardware layers of a system is not high enough, because such encryption will be cracked at a lower level. Furthermore, the conventional solutions are comparatively complicated in both of the process for encryption and/or decryption and the process for management.

SUMMARY

The present disclosures provides a method and an electronic device for processing information to address the technical problem that the security level of conventional solutions for protecting data security and privacy by encryption at software and/or hardware layers of a system is comparatively low and the solutions are comparatively complicated.

In an aspect of the present disclosure, a method for processing information is provided. The method is applied in a solid state storage apparatus which is connected to an electronic device. The solid state storage apparatus supports N logical-address-to-physical-address mapping tables different from each other simultaneously, wherein N is an integer greater than or equal to 1. The method comprises: receiving identity information for a user from the electronic device; determining a first logical-address-to-physical-address mapping table corresponding to the user based on the identity information; and assigning the first logical-address-to-physical-address mapping table to the user.

Alternatively, the receiving identity information for a user from the electronic device comprises: receiving identity information for a user from the electronic device when the solid state storage apparatus is initialized.

Alternatively, the determining a first logical-address-to-physical-address mapping table corresponding to the user based on the identity information comprises: detecting whether the first logical-address-to-physical-address mapping table is stored in the solid state storage apparatus based on the identity information; if yes, determining the first logical-address-to-physical-address mapping table; and otherwise, creating a first logical-address-to-physical-address mapping table corresponding to the user.

Alternatively, after the determining a first logical-address-to-physical-address mapping table corresponding to the user based on the identity information, the method further comprises: labeling physical addresses in the first logical-address-to-physical-address mapping table.

In another aspect of the present disclosure, a method for processing is provided. The method is applied in an electronic device which is connected to a solid state storage apparatus and an input apparatus. The storage apparatus and the input apparatus are physically independent to each other. The solid state storage apparatus supports N logical-address-to-physical-address mapping tables different from each other simultaneously, wherein N is an integer greater than or equal to 1. The method comprises: acquiring identity information for a user through the input apparatus; and transmitting the identity information to a controller of the solid state storage apparatus through an interface to enable the controller to determine a logical-address-to-physical-address mapping table corresponding to the user based on the identity information.

Alternatively, the acquiring identity information for a user through the input apparatus comprises: acquiring identity information for a user through the input apparatus before the operating system of the electronic device is loaded.

Alternatively, the transmitting the identity information to a controller of the solid state storage apparatus through an interface comprises: transmitting the identity information to a controller of the solid state storage apparatus through an interface in the initialization stage of the solid state storage apparatus.

Alternatively, the controller is further configured to translate a logical address in the electronic device into a physical address in the solid state storage apparatus.

In yet another aspect of the present disclosure, a solid state storage apparatus is provided. The solid state storage apparatus is connected to an electronic device. The solid state storage apparatus supports N logical-address-to-physical-address mapping tables different from each other simultaneously, wherein N is an integer greater than or equal to 1. The solid state storage apparatus comprises: an interface configured to receive identity information for a user from the electronic device; a controller configured to determine a first logical-address-to-physical-address mapping table corresponding to the user based on the identity information, and to assign the first logical-address-to-physical-address mapping table to the user; a first storage area configured to store the first logical-address-to-physical-address mapping table; and a second storage area configured to store data.

Alternatively, the interface is further configured to: receive identity information for a user from the electronic device when the solid state storage apparatus is initialized.

Alternatively, the controller is further configured to: detect whether the first logical-address-to-physical-address mapping table is stored in the first storage area based on the identity information; if yes, determining the first logical-address-to-physical-address mapping table; and otherwise, creating a first logical-address-to-physical-address mapping table corresponding to the user, and storing the first logical-address-to-physical-address mapping table into the first storage area.

Alternatively, the controller is further configured to: label physical addresses in the first logical-address-to-physical-address mapping table.

Alternatively, the controller is further configured to: translate a logical address in the electronic device into a physical address in the solid state storage apparatus.

In a further aspect of the present disclosure, an electronic device is provided. The electronic device is connected to a solid state storage apparatus and an input apparatus. The storage apparatus and the input apparatus are physically independent to each other. The solid state storage apparatus supports N logical-address-to-physical-address mapping tables different from each other simultaneously, wherein N is an integer greater than or equal to 1. The electronic device comprises: a processing unit configured to acquire identity information for a user through the input apparatus; and an interface configured to transmit the identity information to a controller of the solid state storage apparatus to enable the controller to determine a logical-address-to-physical-address mapping table corresponding to the user based on the identity information.

Alternatively, the input apparatus is further configured to: acquire identity information for a user through the input apparatus before the operating system of the electronic device is loaded.

Alternatively, the interface is further configured to: transmit the identity information to a controller of the solid state storage apparatus through an interface in the initialization stage of the solid state storage apparatus.

Alternatively, the controller is further configured to translate a logical address in the electronic device into a physical address in the solid state storage apparatus.

The embodiments of the present disclosure provide one or more technical solutions having at least the following technical effects or advantages.

In an embodiment of the present disclosure, a solid state storage apparatus supports N logical-address-to-physical-address mapping tables different from each other simultaneously. When the solid state storage apparatus is connected to an electronic device, for example, through a SATA data interface or by being embedded into the electronic device, it receives identity information for a user from the electronic device. Based on the identity information, a first logical-address-to-physical-address mapping table corresponding to the user is determined. The first logical-address-to-physical-address mapping table is assigned to this user. In the present embodiment, by having each user correspond to a different logical-address-to-physical-address mapping table, stored data for different users are isolated, thereby data security is achieved. Furthermore, the whole process is implemented in the solid state storage apparatus internally, and no processing has to be done by the host system. The whole process is isolated from the user, and therefore the security level is even higher, and the complexity of the host system is reduced.

DETAILED DESCRIPTION

The present disclosures provides a method and an electronic device for processing information to address the technical problem that the security level of conventional solutions for protecting data security and privacy by encryption at software and/or hardware layers of a system is comparatively low and the solutions are comparatively complicated.

In order to address the above technical problem, the general concept of the technical solutions according to the embodiments of the present disclosure is as follows.

In an embodiment of the present disclosure, a solid state storage apparatus supports N Logical-address-to-Physical-address (L2P) mapping tables different from each other simultaneously. When the solid state storage apparatus is connected to an electronic device, for example, through a SATA data interface or by being embedded into the electronic device, it receives identity information for a user from the electronic device. Based on the identity information, a first logical-address-to-physical-address mapping table corresponding to the user is determined. The first logical-address-to-physical-address mapping table is assigned to this user. In the present embodiment, by having each user correspond to a different logical-address-to-physical-address mapping table, stored data for different users are isolated, thereby data security is achieved. Furthermore, the whole process is implemented in the solid state storage apparatus internally, and no processing has to be done by the host system. The whole process is isolated from the user, and therefore the security level is even higher, and the complexity of the host system is reduced.

To understand the above technical solution better, detailed description of the above technical solution will be given below in conjunction with the drawings and specific implementations.

An embodiment of the present disclosure provides a method for processing information. First, an introduction will be given below from the view of a solid state storage apparatus. The solid state storage apparatus is specifically a solid state disk, for example. This solid state storage apparatus is connected to an electronic device, such as a smart phone, a tablet, or a notebook computer, wherein the "connection" may be established through a data interface, such as a SATA interface, or the solid state storage apparatus may be embedded into the electronic device.

Figure 1:
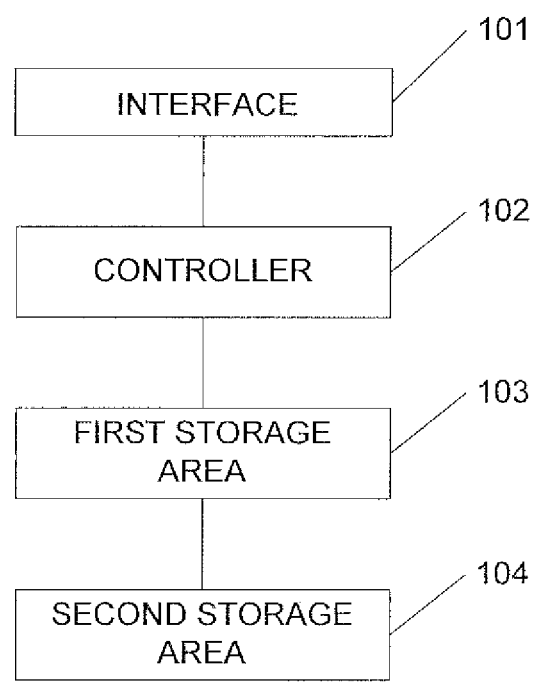
FIG. 1 is a block diagram illustrating a solid state storage apparatus according to an embodiment of the present disclosure.

Further, in the present embodiment, referring to FIG. 1, the solid state storage apparatus comprises: an interface 101 configured to receive identity information for a user from the electronic device; a controller 102 configured to determine a first logical-address-to-physical-address mapping table corresponding to the user based on the identity information, and to assign the first logical-address-to-physical-address mapping table to the user; a first storage area 103 configured to store the first logical-address-to-physical-address mapping table; and a second storage area 104 configured to store data. Further, the first storage area 103 may store N logical-address-to-physical-address mapping tables different from each other simultaneously, wherein N is an integer greater than or equal to 1. The solid state storage apparatus supports N L2P tables different from each other simultaneously.

In a further embodiment, the controller 102 is further configured to translate a logical address in the electronic device into a physical address in the solid state storage apparatus. This function can be specifically implemented by an FTL module in the controller 102. In other words, in the present embodiment, it is the controller 102 in the solid state storage apparatus who implements both of the function of determining an L2P table corresponding to each user and the function of assigning these L2P tables.

Figure 2:
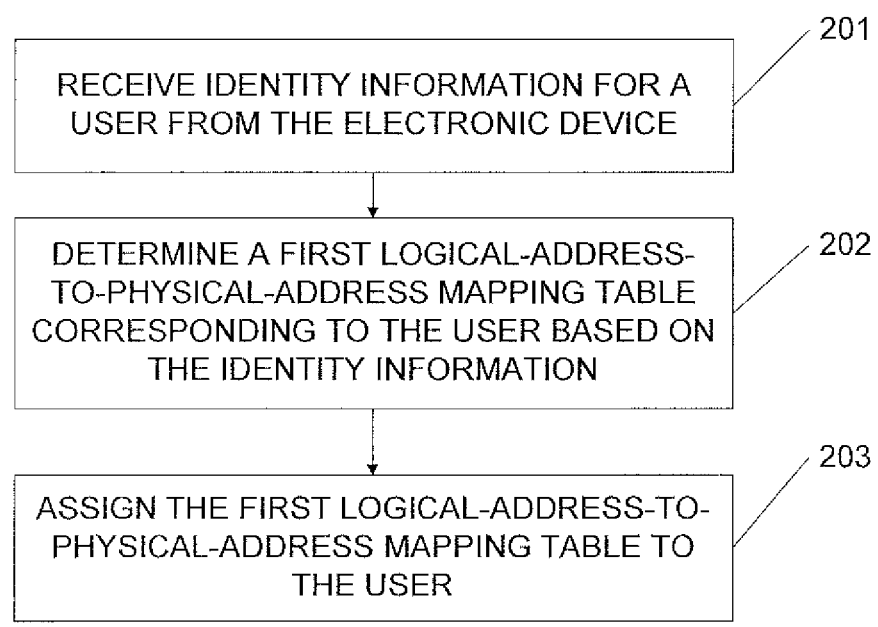
FIG. 2 is a schematic diagram illustrating a method for processing information according to an embodiment of the present disclosure.

Next, please refer to FIG. 2 which is a flow chart illustrating the method for processing information according to the present embodiment. This method may be applied in the solid state storage apparatus shown in FIG. 1. The method comprises:

Step 201: receiving identity information for a user from the electronic device;

Step 202: determining a first logical-address-to-physical-address mapping table corresponding to the user based on the identity information; and Step 203: assigning the first logical-address-to-physical-address mapping table to the user.

To facilitate the understanding of the implementation of the method for processing information according to the embodiment of the present disclosure more clearly by one skilled in the art, specific examples will be given below for detailed explanation.

In particular, step 201 is that identity information for a user is received from the electronic device through the interface 101 when the solid state storage apparatus is initialized.

In particular, step 202 is that whether the first logical-address-to-physical-address mapping table is stored in the solid state storage apparatus is detected based on the identity information; if yes, the first logical-address-to-physical-address mapping table is determined; and otherwise, a first logical-address-to-physical-address mapping table corresponding to the user is created. This step can be performed by the controller 102.

For example, the identity information received through the interface 101 is User1, and then the controller 102 looks up in the first storage area 103 a first L2P table matching with User1. If the L2P table is stored in the first storage area 103, then the first L2P table is determined. If the L2P table corresponding to User1 is not found in the first storage area, then the controller 102 creates an L2P table and assigns it to the user to use.

To facilitate the controller in looking up, a correspondence relation between identity information and L2P tables may be established. For example, for User 1, the number of a corresponding L2P table is 10. First, the controller will look up in this correspondence table to find out that the number of the L2P table corresponding to the User 1 is 10, and then loop up in the first storage area 103 the L2P table with the number of 10. If such an L2P table is found, then the L2P table with the number of 10 is determined. If such an L2P table is not found, then an L2P table will be created, and this correspondence table is updated with the correspondence relation between the identity information of the user and the number of the L2P table. This correspondence table may also be stored in the first storage area 103.

In another embodiment, this correspondence table may be not necessary. Instead, an L2P table is named after the identity information when created. For example, the identity information represents the identification of the user, such as, User1. In this case, "User1-L2P table" will be used as the name for the L2P table when created. In this way, when looking up, only an L2P table with a name comprising this identity information is to be determined as the L2P table corresponding to this user.

Of course, in practice, other methods for looking for or detecting whether the first L2P table is stored in the solid state storage apparatus are also possible.

In a further embodiment, to further improve data security, after step 101 and before step 102, the method further comprises: verifying whether this user is a valid user or not based on the identity information, and performing step 102 only when this user is a valid user. In particular, the verification is performed with the account and password in the identity information. Further, the verification data may also be stored in the first storage area 103, or a third storage area may be allocated from the second storage area 104 and isolated from the second storage area 104 for storing the verification data.

Next, step 103 is performed. In other words, the determined first L2P table is assigned to this user and not to other user.

In a further embodiment, after step 103, the method further comprises: labeling physical addresses in the first L2P mapping table. In this way, physical addresses used by this user will be prevented from being assigned to other user, and the data of this user will not be modified or acquired by other user. Similarly, this step can be implemented by the controller 102.

Figure 3:
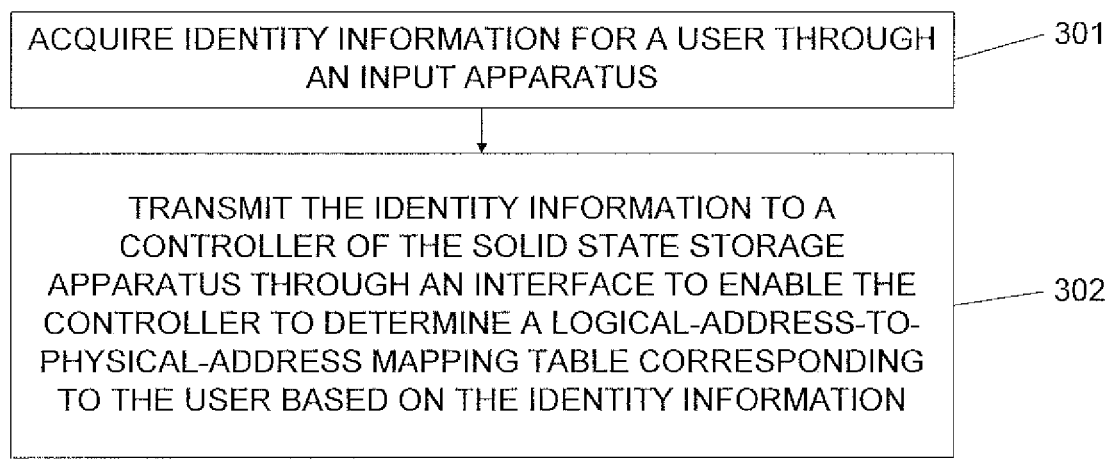
FIG. 3 is a schematic diagram illustrating a method for processing information according to another embodiment of the present disclosure.

The process for implementing the method for processing information according to an embodiment of the present disclosure will be described below from the view of an electronic device. In the present embodiment, the electronic device is connected to a solid state storage apparatus as shown in FIG. 1 and an input apparatus. This input apparatus is a keyboard or a finger print recognizer, for example. The storage apparatus and the input apparatus are physically independent to each other. In other words, information input through the input apparatus cannot be transferred to the solid state storage apparatus directly, and should be relayed by the electronic device. Referring to FIG. 3, this method comprises:

Step 301: acquiring identity information for a user through the input apparatus;

Step 302: transmitting the identity information to a controller 102 of the solid state storage apparatus through an interface to enable the controller 102 to determine a logical-address-to-physical-address mapping table corresponding to the user based on the identity information.

In particular, in step 301, identity information for a user is acquired through the input apparatus before the operating system of the electronic device is loaded. For example, in the stage of Power On Self Test (POST) or bootloader of the electronic device, or when the system is logged in, the identity information is determined by a keyboard input or a finger print recognition device.

Next, step 302 is performed. In particular, the identity information may be transmitted to a controller 102 of the solid state storage apparatus through an interface in the initialization stage of the solid state storage apparatus, and then the controller 102 performs step 302.

A specific instance will be described below with reference to FIG. 1-FIG. 4.

Figure 4:
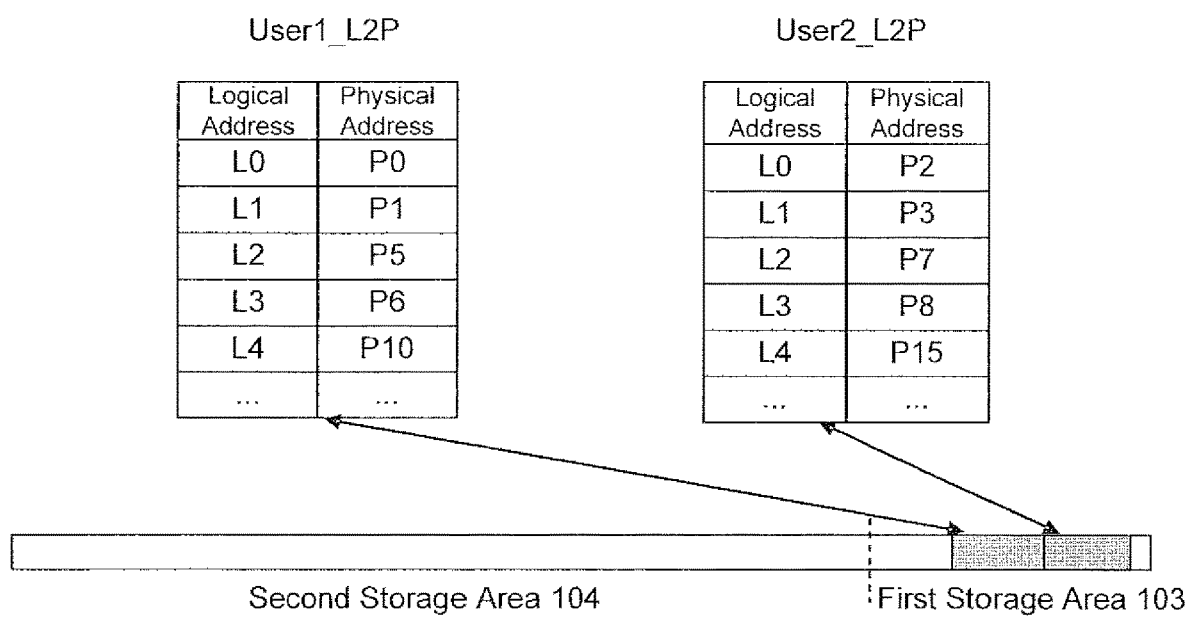
FIG. 4 is a schematic diagram illustrating the structure of a solid state storage apparatus according to an embodiment of the present disclosure.

First, given that the electronic device is a notebook computer, a solid state storage apparatus is connected to this electronic device. As shown in FIG. 4, a first storage area 103 is a protected area and can only be accessed by a controller 102. A second storage area 104 is a user data area. Assuming that two L2P tables are stored in the first storage area 103, one is User1_L2P, and the other is User2_L2P.

Next, the electronic device is powered on. The password is entered through a keyboard when the user logs into the system, for example. At this time, step 301 is performed. In other words, the operation system acquires the identity information for the user comprising the account and password for the user.

Next, step 302 is performed. In other words, the operating system transmits this identity information to the controller 102 of the solid state storage apparatus through an interface. In particular, this identity information is transmitted to the controller 102 when the solid state storage apparatus is initialized. Accordingly, the solid state storage apparatus performs step 201. In other words, the solid state storage apparatus receives the identity information for the user from the electronic device.

Next, step 202 is performed. In other words, based on the identity information, the first L2P table corresponding to the user is determined.

Given that the identity information acquired at step 301 has a user account, User1, the controller will find a corresponding first L2P table in the first storage area 103, i.e., User1_L2P. If the identity information acquired at step 301 has a user account, User2, the controller will find a corresponding User2_L2P table in the first storage area 103.

In a further embodiment, to further improve the security, before the controller 102 performs step 202, it is verified whether the user is a valid user based on the identity information. At this time, the verification is to be performed with the user account and password in the identity information. Step 202 will be performed only after the user account and password are verified successfully.

It can be determined from FIG. 4 that physical addresses corresponding to a same logical address for different users, User1 and User2, are different, and the physical addresses user by both users are not overlapped with each other. In this way, spaces accessed by different users may be isolated physically. In practice, with regard to the distribution in the physical space, the physical addresses used by different users may be staggered, and no pattern is presented. It is very difficult to crack personal data of different users directly, and therefore the security for data of each user is improved.

The solid state storage apparatus and method for processing information according to the embodiments of the present disclosure may be applicable to a plurality of scenarios. For example, multiple users use one solid state disk simultaneously, and data can be completely isolated from each other. Furthermore, different access spaces can be set for different users. For example, a user level may be determined based on the identity information of the user, such as, a normal user or a premium user. If the user is a normal user, then assigned L2P table may only use partial storage space of the solid storage apparatus; whereas if the user is a premium user, then the assigned L2P table may access all storage space. For another example, when the solid state disk is used as the system disk of the electronic device, the operating system is installed in the public space. Each user occupies a part of private space, and private spaces are isolated from each other to guarantee the safety for the data of each user.

Based on the same inventive concept, another embodiment of the present disclosure provides an electronic device. The electronic device is an electronic device, such as a smart phone, a tablet, etc. The electronic device is connected to a solid state storage apparatus and an input apparatus. The storage apparatus and the input apparatus are physically independent to each other. In other words, the information input through the input apparatus cannot be transferred to the solid state storage apparatus directly, and have to be relayed by the electronic device. The solid state storage apparatus is a solid state storage apparatus as described with reference to FIG. 2, and it supports N L2P tables different from each other simultaneously.

Figure 5:
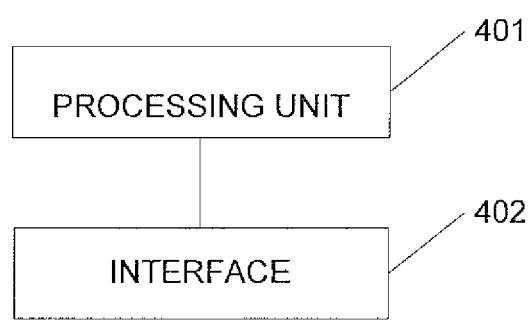
FIG. 5 is a functional block diagram illustrating an electronic device according to an embodiment of the present disclosure.

As shown in FIG. 5, the electronic device comprises: a processing unit 401 configured to acquire identity information for a user; and an interface 402 configured to transmit the identity information to a controller 102 of the solid state storage apparatus to enable the controller 102 to determine a logical-address-to-physical-address mapping table corresponding to the user based on the identity information.

Further, the processing unit 401 is further configured to: acquire identity information for a user through the processing unit 401 before the operating system of the electronic device is loaded. In particular, the input apparatus is a keyboard or a finger print recognition device, for example.

In an embodiment, the interface 402 is further configured to: transmit the identity information to a controller 102 of the solid state storage apparatus through an interface 402 in the initialization stage of the solid state storage apparatus.

The processing unit 401 may be slightly different for different cases. For example, if it is in the stage of POST, then the identity information input by the user through the keyboard will be captured by BIOS (Basic Input Output System), and transmitted to the solid state storage apparatus through the SATA interface. At this time, the processing unit 401 is the BIOS chip. For another example, when the electronic device has loaded the operating system, and the solid state storage apparatus is a removable hard disk, the solid state storage apparatus is then connected to the electronic device through the SATA interface. At this time, the identity information input by the user through the keyboard is captured by the operating system, and transmitted to the solid state storage apparatus through the SATA interface. At this time, the processing unit 401 is the operating system. In practice, other firmware or hardware or software may be used to transmit the identity information to the solid state storage apparatus, as long as the information acquired by the input apparatus is relayed to the solid state storage information.

Various variants and specific instances of the method for processing information according to the above embodiments as shown in FIG. 3 may also be applicable to the electronic device of the present embodiment. From the above detailed description of the method for processing information, it is clear for one skilled in the art to know how to implement the electronic device of the present embodiment. Therefore, the description thereof is omitted for simplicity.

The embodiments of the present disclosure provide one or more technical solutions having at least the following technical effects or advantages.

In an embodiment of the present disclosure, a solid state storage apparatus supports N logical-address-to-physical-address mapping tables different from each other simultaneously. When the solid state storage apparatus is connected to an electronic device, for example, through a SATA data interface or by being embedded into the electronic device, it receives identity information for a user from the electronic device. Based on the identity information, a first logical-address-to-physical-address mapping table corresponding to the user is determined. The first logical-address-to-physical-address mapping table is assigned to this user. In the present embodiment, by having each user correspond to a different logical-address-to-physical-address mapping table, stored data for different users are isolated, thereby data security is achieved. Furthermore, the whole process is implemented in the solid state storage apparatus internally, and no processing has to be done by the host system. The whole process is isolated from the user, and therefore the security level is even higher, and the complexity of the host system is reduced.

It should be appreciated by one skilled in the art that the embodiments of the present disclosure may be provided as methods, systems, or computer program products. Therefore, the present disclosure may be implemented in pure hardware, pure software, or the combination of software and hardware. Further, the present disclosure may be implemented as a computer program product embodied on one or more computer usable storage media (comprising but not limited to disk storage, CD-ROM, optical storage, etc.) having computer usable program code therein.

The present disclosure is described with reference to flow charts and/or block diagrams of the methods, devices (systems), and computer program products according to embodiments of the present disclosure. It is to be understood that any flow and/or block in the flow charts and/or block diagrams and any combination of flow and/or block in the flow charts and/or block diagrams may be implemented by computer program instructions. These computer program instructions may be provided to processors of general purpose computers, special purpose computers, embedded processing machines or any other programmable data processing devices to form a machine such that means having functions specified in one or more flows in the flow charts and/or one or more blocks in the block diagrams can be implemented by instructions executed by processors of the computers or any other programmable data processing devices.

The computer program instructions may also be stored in computer readable memories which may guide the computers or any other programmable data processing devices to function in such a manner that the instructions stored in these computer readable memories may generate manufactures comprising instruction means, the instruction means implementing functions specified in one or more flows in the flow charts and/or one or more blocks in the block diagrams.

These computer program instruction may also loaded to computers or any other programmable data processing devices such that a series of operation steps are performed on the computers or any other programmable devices to generate processing implemented by the computers. Therefore, the instructions executed on the computers or any other programmable devices provide steps for implementing functions specified in one or more flows in the flow charts and/or one or more blocks in the block diagrams.

It is obvious that one skilled in the art may make various modifications and variants to the present disclosure without departing from the spirit and scope of the present disclosure. In this way, if these modifications and variants of the present disclosure belong to the scope of the claims of the present disclosure and its full scope equivalents, the present disclosure is intended to embrace these modifications and variants.

We claim:

1. A method for processing information, wherein the method is applied in a solid state storage apparatus which is connected to an electronic device, the solid state storage apparatus supports N logical-address-to-physical-address mapping tables different from each other simultaneously, wherein N is an integer greater than or equal to 1, a first storage area is a protected area and configured to store the first logical-address-to-physical-address mapping table; a second storage area is a user data area and configured to store data, the method comprising:

receiving identity information for a user of the electronic device from the electronic device, the identity information for the user of the electronic device being acquired before an operating system of the electronic device is loaded;

verifying whether this user is a valid user or not based on the identity information, wherein verification data may be stored in the first storage area, or a third storage area may be allocation data from the second storage area and isolated from the second storage area;

if the user is valid, determining a first logical-address-to-physical-address mapping table corresponding to the user based on the identity information; if the first logical-address-to-physical-address mapping table is not stored in the solid state storage apparatus, creating a first logical-address-to-physical-address mapping table corresponding to the user; and assigning the first logical-address-to-physical-address mapping table to the user and not to another user, such that each user is assigned with a different logical-address-to-physical-address mapping table, wherein the logical-address-to-physical-address mapping table translates a logical address in the electronic device into a physical address in the solid state storage apparatus, so that the electronic device can only access physical addresses defined by the first logical-address-to-physical-address mapping table.

2. The method according to claim 1, wherein the receiving identity information for a user of the electronic device from the electronic device comprises:

receiving identity information for a user of the electronic device from the electronic device when the solid state storage apparatus is initialized.

3. The method according to claim 1, wherein the determining a first logical-address-to-physical-address mapping table corresponding to the user based on the identity information comprises:

detecting whether the first logical-address-to-physical-address mapping table is stored in the solid state storage apparatus based on the identity information;

if the first logical-address-to-physical-address mapping table is stored in the solid state storage apparatus, determining the first logical-address-to-physical-address mapping table.

4. The method according to claim 1, wherein after the determining a first logical-address-to-physical-address mapping table corresponding to the user based on the identity information, the method further comprises:

labeling physical addresses in the first logical-address-to-physical-address mapping table.

5. A method for processing information, wherein the method is applied in an electronic device which is connected to a solid state storage apparatus and an input apparatus, wherein the storage apparatus and the input apparatus are physically independent to each other, and the solid state storage apparatus supports N logical-address-to-physical-address mapping tables different from each other simultaneously, wherein N is an integer greater than or equal to 1, a first storage area is a protected area and configured to store the first logical-address-to-physical-address mapping table; a second storage area is a user data area and configured to store data, the method comprising:

acquiring identity information for a user of the electronic device through the input apparatus before an operating system of the electronic device is loaded; and transmitting the identity information to a controller of the solid state storage apparatus through an interface to enable the controller to verify whether this user is a valid user or not based on the identity information;

if the user is valid, determine a logical-address-to-physical-address mapping table corresponding to the user based on the identity information, such that each user is assigned with a different logical-address-to-physical-address mapping table, wherein the logical-address-to-physical-address mapping table translates a logical address in the electronic device into a physical address in the solid state storage apparatus, so that the electronic device can only access physical addresses defined by the logical-address-to-physical-address mapping table corresponding to the user and not to another user.

6. The method according to claim 5, wherein the transmitting the identity information to a controller of the solid state storage apparatus through an interface comprises:

transmitting the identity information to a controller of the solid state storage apparatus through an interface in the initialization stage of the solid state storage apparatus.

7. A solid state storage apparatus connected to an electronic device, the solid state storage apparatus supports N logical-address-to-physical-address mapping tables different from each other simultaneously, wherein N is an integer greater than or equal to 1, the solid state storage apparatus comprising:

an interface configured to receive identity information for a user of the electronic device from the electronic device, the identity information for the user of the electronic device being acquired before an operating system of the electronic device is loaded;

a controller configured to verify whether this user is a valid user or not based on the identity information, wherein verification data may be stored in a first storage area, or a third storage area may be allocation data from a second storage area and isolated from the second storage area;

if the user is valid, determine a first logical-address-to-physical-address mapping table corresponding to the user based on the identity information, if the first logical-address-to-physical-address mapping table is not stored in the solid state storage apparatus, creating a first logical-address-to-physical-address mapping table corresponding to the user, and to assign the first logical-address-to-physical-address mapping table to the user and not to another user, such that each user is assigned with a different logical-address-to-physical-address mapping table, wherein the logical-address-to-physical-address mapping table translates a logical address in the electronic device into a physical address in the solid state storage apparatus, so that the electronic device can only access physical addresses defined by the first logical-address-to-physical-address mapping table;

the first storage area is a protected area and configured to store the first logical-address-to-physical-address mapping table; and the second storage area is a user data area and configured to store data.

8. The solid state storage apparatus according to claim 7, wherein the interface is further configured to: receive identity information for a user of the electronic device from the electronic device when the solid state storage apparatus is initialized.

9. The solid state storage apparatus according to claim 7, wherein the controller is further configured to:

detect whether the first logical-address-to-physical-address mapping table is stored in the first storage area based on the identity information;

if the first logical-address-to-physical-address mapping table is stored in the solid state storage apparatus, determining the first logical-address-to-physical-address mapping table.

10. The solid state storage apparatus according to claim 7, wherein the controller is further configured to: label physical addresses in the first logical-address-to-physical-address mapping table.

11. An electronic device connected to a solid state storage apparatus and an input apparatus, the storage apparatus and the input apparatus are physically independent to each other, and the solid state storage apparatus supports N logical-address-to-physical-address mapping tables different from each other simultaneously, wherein N is an integer greater than or equal to 1, a first storage area is a protected area and configured to store the first logical-address-to-physical-address mapping table; a second storage area is a user data area and configured to store data, the electronic device comprising:

a processing unit configured to acquire identity information for a user of the electronic device through the input apparatus before an operating system of the electronic device is loaded; and an interface configured to transmit the identity information to a controller of the solid state storage apparatus to enable the controller to verify whether this user is a valid user or not based on the identity information;

if the user is valid, determine a logical-address-to-physical-address mapping table corresponding to the user based on the identity information, such that each user is assigned with a different logical-address-to-physical-address mapping table, wherein the logical-address-to-physical-address mapping table translates a logical address in the electronic device into a physical address in the solid state storage apparatus, so that the electronic device can only access physical addresses defined by the logical-address-to-physical-address mapping table corresponding to the user and not to another user.

12. The electronic device according to claim 11, wherein the interface is further configured to: transmit the identity information to a controller of the solid state storage apparatus through the interface in the initialization stage of the solid state storage apparatus.

\* \* \* \* \*